(12) United States Patent
Benchaib et al.

(10) Patent No.: US 6,850,863 B2
(45) Date of Patent: Feb. 1, 2005

(54) METHOD AND A COMPUTER FOR DETERMINING THE STOPPED ANGULAR POSITION OF A ROTOR, A CONTROL UNIT, AND A SYSTEM INCORPORATING THE COMPUTER

(75) Inventors: Abdelkrim Benchaib, Montigny le Bretonneux (FR); Jean-Claude Alacoque, Communay (FR); Serg Poullain, Arpajon (FR); Jean-Luc Thomas, Fontainebleau (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/653,250

(22) Filed: Sep. 3, 2003

(65) Prior Publication Data

US 2004/0085064 A1 May 6, 2004

(30) Foreign Application Priority Data

Sep. 5, 2002 (FR) .......................................... 02 11002

(51) Int. Cl.⁷ ............................................. G01C 17/00
(52) U.S. Cl. ...................................... 702/151; 318/254
(58) Field of Search .................... 310/68 B; 318/254, 318/445, 599, 608, 700, 806; 702/151

(56) References Cited

U.S. PATENT DOCUMENTS 5,001,405 A    3/1991   Cassat
5,796,235 A    8/1998   Schrodl et al.
6,172,498 B1   1/2001   Schmidt et al.
6,246,193 B1 * 6/2001   Dister ........................ 318/254

FOREIGN PATENT DOCUMENTS

EP      0 827 267 A      3/1998
WO      WO 90 12278 A   10/1990

* cited by examiner

*Primary Examiner*—John Barlow
*Assistant Examiner*—Stephen J. Cherry
(74) *Attorney, Agent, or Firm*—Sughrue Mion, PLLC (57) ABSTRACT

The method of determining the stopped angular position of a rotor comprises the following steps:

a) applying a sequence of successive voltage vectors to the terminals of the windings of the stator, said sequence including first and second voltage vectors adapted to modify the electrical characteristics of the windings and a third voltage vector adapted to cancel out the torque created by applying the first and second voltage vectors, b) determining a response signal from all of the windings to application of the first and second voltage vectors, and c) establishing the angular position of the rotor with an uncertainty of ±90° from the signals determined in the step b).

21 Claims, 5 Drawing Sheets

METHOD AND A COMPUTER FOR DETERMINING THE STOPPED ANGULAR POSITION OF A ROTOR, A CONTROL UNIT, AND A SYSTEM INCORPORATING THE COMPUTER

The invention relates to a method and a system for determining the angular position of a rotor when stopped in a stator of a synchronous rotary electrical machine in which the stator has windings adapted to create a magnetic field for driving rotation of the rotor, and each winding has one or more terminals for applying a supply voltage.

BACKGROUND OF THE INVENTION

It is particularly important to be able to determine the stopped position of a rotor, in particular so as to be able to apply the most appropriate control signals immediately on starting the synchronous rotary electrical machine.

In most prior art systems, the synchronous rotary electrical machine is therefore equipped with sensors responsive to the angular position of the rotor. Recent research has developed methods for measuring the stopped angular position of the rotor without using position sensors. For example, European Patent Application EP 1 160 966 discloses a method of this type applied to a rotary electrical machine including a permanent magnet rotor and a stator which has an excitation winding for each phase. The windings of this rotary electrical machine are connected in a star configuration.

The method disclosed in EP 1 160 966 comprises the following steps:

applying a pair of successive voltage pulses of equal and opposite predefined values to the terminals of a first winding and then a second winding, respectively, for each pulse and after a predefined time interval, measuring a voltage at the terminals of a measuring resistor connected between the neutral of the star configuration and ground, for each pair of pulses, determining the difference between the two voltages measured at the terminals of the resistor for the first winding and then for the second winding, respectively, establishing possible angular positions of the rotor from prestored data representing the correlation between those angular positions and the differences previously determined, and selecting from the possible angular positions previously established the one that is the most probable.

Although satisfactory, that method has a number of drawbacks. In particular, the architecture of the rotary electrical machine and its control unit must be modified. In addition to an inverter adapted to apply three-phase voltages to the terminals of the windings of the rotary electrical machine, the control unit must be equipped with an independent generator of pairs of pulses to be applied to the terminals of the windings. The motor must be modified to connect a voltage sensor between the star neutral and ground.

OBJECTS AND SUMMARY OF THE INVENTION

The invention aims to remedy those drawbacks by proposing a method of determining the stopped angular position of a rotor that is simpler to use.

The invention therefore provides a method as described above comprising the following steps:

a) applying a first sequence of successive voltage vectors to the terminals of the windings, each voltage vector defining the value of the voltage to be applied simultaneously to the supply terminals of the windings, said first sequence including first and second voltage vectors adapted to modify the electrical characteristics of the windings when the driving magnetic field created by the windings is added to the magnetic field of the rotor and a third voltage vector adapted to cancel out the torque created by applying the first and second voltage vectors, b) determining a response signal from all of the windings to application of the first voltage vector and then a response signal to application of the second voltage vector, said response signals being correlated to the angular position of the rotor, and c) establishing the angular position of the rotor with an uncertainty of ±90° from the signals determined in the step b).

The above method applies to the terminals of the windings of the stator voltage vectors similar to those applied by the inverter to start and control the rotary electrical machine when a vector control method is used to control the machine. Thus applying this kind of voltage vector requires no adaptation of the control unit. In particular, and in contradistinction to the method disclosed in EP 1 160 966, no supplementary pulse generator is required. Moreover, since it is necessary to establish the response signal for all the windings of the stator, rather than the response of each individual winding, no access is needed to the neutral.

According to other features of the method according to the invention:

the method further comprises the following steps:

d) iterating the step a) n times with, on each iteration, a new sequence of voltage vectors including a voltage vector offset angularly relative to the voltage vectors of the preceding sequences, e) on each iteration of the step d), determining, at least for the angularly offset vector, a response signal from each winding to application of said voltage vector, said response signal being correlated to the angular position of the rotor, and f) using the results of the step e) to reduce the uncertainty as to the position established during the step c);

each new sequence of voltage vectors applied further comprises first and second voltage vectors adapted to modify the electrical characteristics of the windings when the driving magnetic field created by the windings is added to the magnetic field of the rotor and a third voltage vector adapted to cancel out the torque created by application of the first and second voltage vectors;

it includes a step of automatically choosing the angular offset of said at least one offset voltage vector of each new sequence so as to halve the uncertainty as to the angular position;

the first and second voltage vectors are in opposite directions;

the third voltage vector is collinear with and in the same direction as the first voltage vector;

the first and second voltage vectors of each sequence are of equal amplitude;

all the voltage vectors of each of said sequences are of equal amplitude;

each voltage vector is obtained by means of a Concordia transformation;

applying each voltage vector causes a current vector to appear that is defined on the basis of the value of all the currents flowing simultaneously in each of the windings of the stator and said signal which is a function of the angular position of the rotor is the time that elapses between the instant at which the amplitude of the current vector is zero and the instant at which the amplitude of the current vector crosses a predetermined threshold;

the predetermined threshold corresponds to the maximum current that can flow in the windings without damaging them;

applying each voltage vector causes the appearance of a current vector that is defined on the basis of the value of all the currents flowing simultaneously in each of the windings of the stator and said signal which is a function of the angular position of the rotor is the value of the amplitude of the current vector after a predetermined time interval starting from the instant at which the amplitude of the current vector is zero has elapsed;

each voltage vector defines the voltage applied to only one voltage application terminal of each winding; and the response signal is determined at the terminals to which the voltage vectors are applied.

The invention also provides a computer adapted to determine the stopped angular position of a rotor in a stator of a synchronous rotary electrical machine, the stator having a plurality of windings adapted to create a magnetic field driving rotation of the rotor, and each winding having one or more supply voltage application terminals, which computer is adapted to:

a) command the application of a first sequence of successive voltage vectors to the terminals of the windings, each voltage vector defining the value of the voltage to be applied simultaneously to the supply terminals of the windings, said first sequence including first and second voltage vectors adapted to modify the electrical characteristics of the windings when the driving magnetic field created by the windings is added to the magnetic field of the rotor and a third voltage vector adapted to cancel out the torque created by applying the first and second voltage vectors, b) determine a response signal from all of the windings to application of the first voltage vector and then a response signal to application of the second voltage vector, said response signals being correlated to the angular position of the rotor, and c) establish the angular position of the rotor with an uncertainty of ±90° from the signals determined in the step b).

According to other features of the computer according to the invention:

the computer is also adapted to:

d) iterate the step a) n times with, on each iteration, a new sequence of voltage vectors including a voltage vector offset angularly relative to the voltage vectors of the preceding sequences, e) on each iteration of the step d), determine, at least for the angularly offset vector, a response signal from each winding to application of said voltage vector, said response signal being correlated to the angular position of the rotor, and f) use the results of the step e) to reduce the uncertainty as to the position established during the step c); and each new sequence of voltage vectors applied further comprises first and second voltage vectors adapted to modify the electrical characteristics of the windings when the driving magnetic field created by the windings is added to the magnetic field of the rotor and a third voltage vector adapted to cancel out the torque created by application of the first and second voltage vectors.

The invention additionally provides a control unit for a synchronous rotary electrical machine, said control unit comprising a circuit for applying a voltage to the synchronous rotary electrical machine and a computer according to the invention adapted to control the voltage application circuit.

The invention further provides a system for driving rotation of a rotor, said system comprising:

a synchronous rotary electrical machine adapted to drive rotation of the rotor, and a control unit for the synchronous rotary electrical machine, wherein the control unit is a control unit according to the invention.

BRIEF DESCRIPTION OF THE DRAWINGS

The invention will be better understood after reading the following description, which is given by way of example only and with reference to the accompanying drawings, in which.

MORE DETAILED DESCRIPTION

Figure 1:
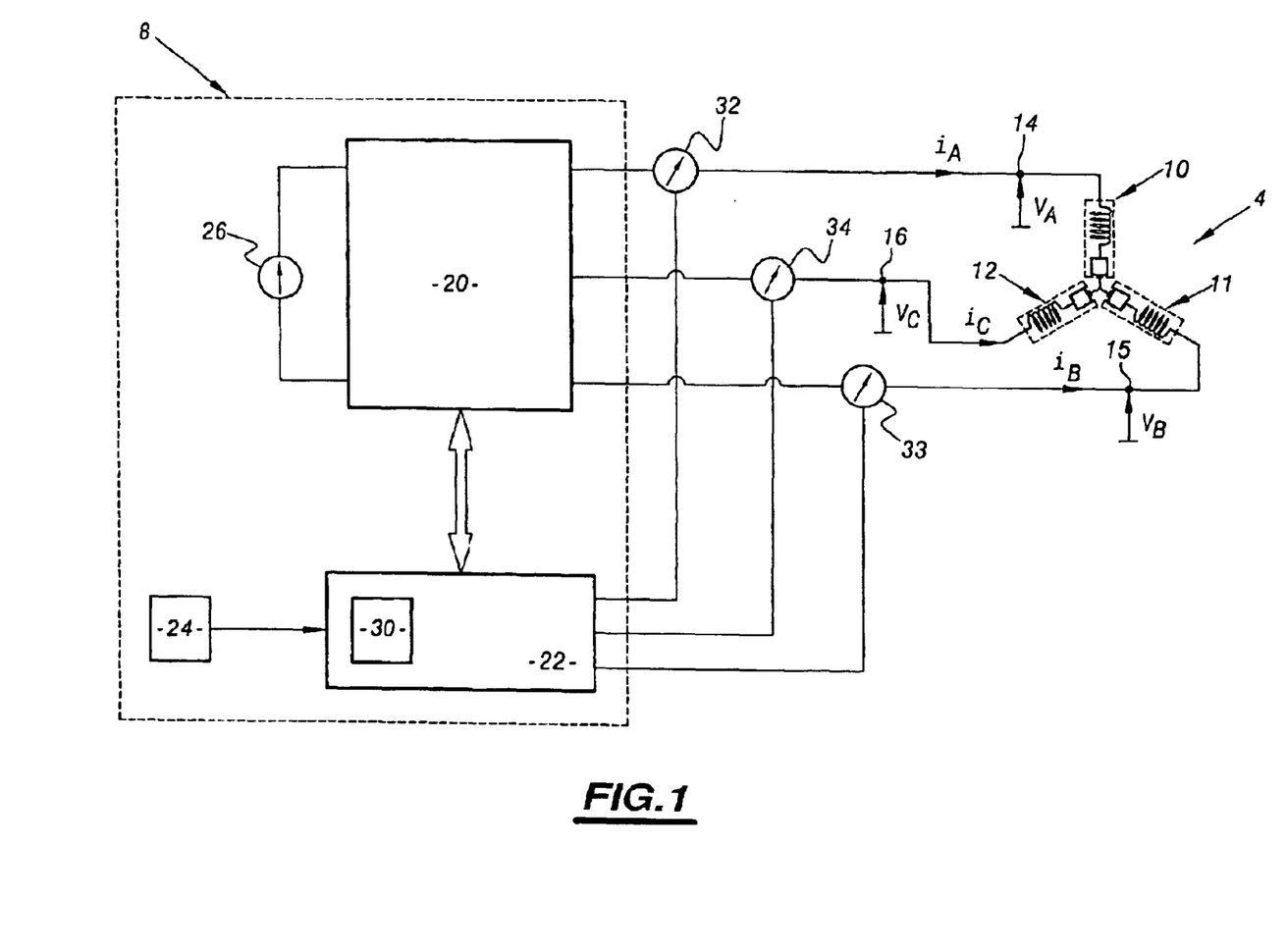
FIG. 1 is a diagram showing the architecture of a system according to the invention.

FIG. 1 shows a synchronous rotary electrical machine 4 connected to a control unit 8 for the machine 4. For example, the machine 4 is a synchronous three-phase rotating electric motor including a rotor housed in a stator. The rotor has permanent magnets, for example, or windings with two or more facing magnetic poles. In this example the rotor is a smooth rotor, i.e. one without salient poles.

The stator has three phases connected in a star configuration and a soft magnetic material armature. Each phase of the stator has a respective excitation winding 10, 11, 12 adapted to attract or repel the poles of the rotor when it is excited. The winding 10 is connected between the neutral point of the star configuration and a single voltage application terminal 14. Similarly, the windings 11 and 12 are connected between the neutral point of the star configuration and respective voltage application terminals 15 and 16.

Voltages $V_A$, $V_B$ and $V_C$ are applied to the terminals 14 to 16, respectively. Currents $I_A$, $I_B$ and $I_C$ flow in the windings 10 to 12, respectively. By design, the current in each winding must not exceed a maximum current beyond which the machine 4 is damaged. This is known in the art. $I_A$ max, $I_B$ max and $I_C$ max are the maximum currents in the windings 10 to 12, respectively.

Applying a three-phase voltage to the terminals 14 to 16 causes the windings to create a rotating magnetic field. This magnetic field has a magnetization direction.

Each magnetization direction corresponds to a set of voltages $V_A$, $V_B$ and $V_C$ whose values are known. This set of voltages to be applied simultaneously to the three terminals 14 to 16 of the windings 10 to 12 is called a voltage vector. The coordinates of this voltage vector in a three-dimensional space are represented by the simultaneous voltages $V_A$, $V_B$ and $V_C$.

Conventionally, and to facilitate the determination of these voltage vectors, the three-dimensional space is reduced to a two-dimensional space referred to as a two-phase frame of reference fixed with respect to the stator. This two-phase frame of reference fixed with respect to the stator is also known as the "α, β frame of reference" in some countries, including France, and as the "D, Q frame of reference" in other countries, including the United States. The change from the three-dimensional space to the two-dimensional space is effected by means of a transformation known in the art as the Concordia transformation. For more information on this transformation see: "Synchronous Machines: Theory and Performance", John Wiley (General Electric series), New York, 1951.

Figure 2:
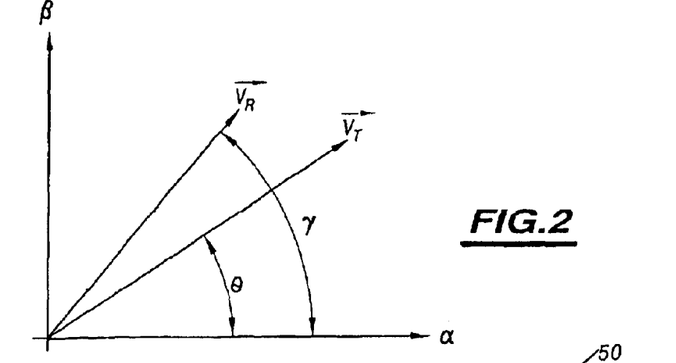
FIG. 2 is a graph representing a voltage vector in a two-phase frame of reference fixed with respect to the stator.

In the α, β frame of reference, the voltage vector is defined by two polar coordinates V cos θ, V sin θ related in a one-to-one or bijective manner to the coordinates $V_A$, $V_B$ and $V_C$ by the Concordia transformation.

FIG. 2 shows an example of an α, β frame of reference in which the vector $V_T$ represents the voltage vector and the vector $V_R$ represents the magnetization direction of the rotor. Here the vector $V_R$ is at an angle γ to the direction α and the vector $V_T$ is at an angle θ to that direction. In the α, β frame of reference the vector $V_T$ is aligned with the magnetization direction of the magnetic field created by the windings.

This representation of the voltage vectors in a particular frame of reference is conventionally used in the art of controlling rotary electrical machines, and in particular controlling the power or the torque of such machines. Control by means of voltage vectors is known as vector control.

The instantaneous and simultaneous values of the currents $I_A$, $I_B$ and $I_C$ also define a set of values forming the coordinates of a current vector $V_I$. In a similar manner to what has been described for voltages, this current vector is defined by two polar coordinates I cos ω, I sin ω in the α, β frame of reference. These coordinates are related in a one-to-one or bijective manner to the coordinates $I_A$, $I_B$ and $I_C$ by the same Concordia transformation.

In the remainder of the description, the amplitude of the voltage vector $V_T$ is denoted V, the amplitude of the current vector $V_I$ is denoted I, and the amplitude of the current vector corresponding to the maximum current that is not to be exceeded in the windings 10 to 12 is denoted $I_{max}$.

The control unit 8 uses a vector control method to control the power developed by the machine 4.

To this end, the control unit 8 comprises a three-phase inverter 20, a programmable computer 22 for controlling the inverter 20, and a control unit 24 adapted to send control instructions to the computer 22.

The three-phase inverter 20 or voltage converter is adapted to apply a voltage to each phase of the machine 4. To this end, it is connected firstly to a DC voltage source 26 and secondly to each of the terminals 14 to 16. The conventional inverter 20 is based on six insulated gate bipolar transistors (IGBT), for example. Its structure is not described here.

The computer 22 is adapted to turn each of the IGBT of the inverter 20 on and off so that the inverter applies to the terminals 14 to 16 of the machine 4 voltages corresponding to a predefined voltage vector. In particular, the computer 22 is adapted to command starting rotation of the rotor of the machine 4 and various operating parameters of the machine 4, such as the rotor rotation speed and the torque or power developed by the machine 4.

To this end, the computer 22 is adapted to execute a conventional vector control algorithm for the machine 4. This algorithm is adapted to convert control instructions sent by the unit 24 into sequences of voltage vectors to be applied to the terminals 14 to 16.

The control unit 24 is adapted to send to the computer 22 instructions to start, accelerate or decelerate the machine 4. The control unit is either automatic or operated manually by an operator.

In the embodiment described here, the programmable computer 22 is adapted to execute the method of determining the stopped angular position of the rotor described with reference to FIG. 3. In particular, the programmable computer 22 implements a time counter 30.

Finally, the computer 22 is connected to three current sensors 32 to 34. The sensors 32 to 34 are connected to the windings 10 to 12 to measure simultaneously the currents $I_A$, $I_B$ and $I_C$.

In machines of the above kind, the magnetic field created by the stator interferes with that created by the rotor. If the magnetization direction of the stator is close to that of the rotor the magnetic fields add and the magnetic field created in the magnetic material of the stator is high. In contrast, if the magnetization direction created by the stator is opposite that of the rotor the magnetic fields subtract and the magnetic field created in the magnetic material of the stator is low.

Under these conditions, for an appropriate choice of the intensity of the magnetic field created by the stator, when the magnetic field of the stator and that of the rotor add the magnetic material is brought to saturation, whereas when they subtract the magnetic material of the stator remains unsaturated. When the magnetic material is saturated, the inductance of the windings 10 to 12 decreases and the current in the windings increases faster in response to the application of a voltage. Thus the evolution of the characteristics of the current in the windings is correlated with or linked to the position of the rotor. In other words, these variations are inversely proportional to the angular difference between the vectors $V_T$ and $V_R$ in the α, β frame of reference. On the other hand, if the direction of the vector $V_T$ is far away from that of the vector $V_R$, then the magnetic material is not saturated and the intensity varies slowly.

Figure 3:
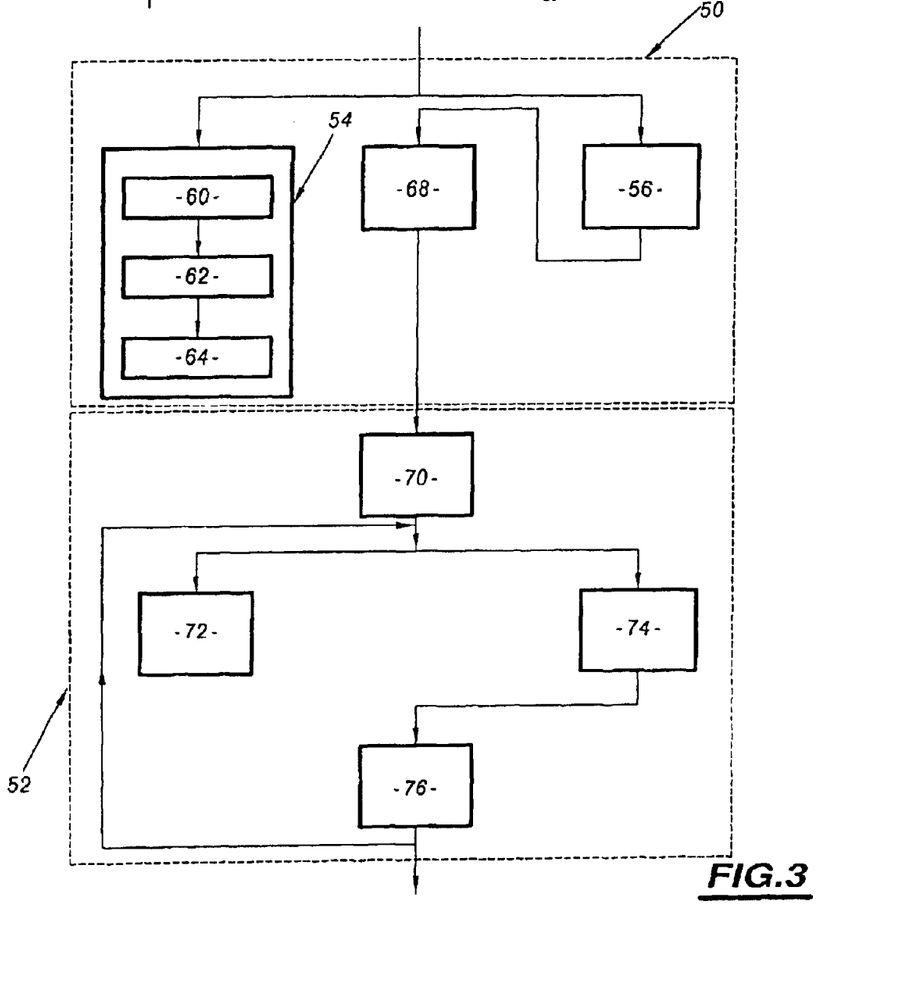
FIG. 3 is a flowchart of a first method according to the invention.

The FIG. 3 method exploits this principle to determine the stopped angular position of the rotor.

The FIG. 3 method is described in the simplified situation in which the rotor of the machine 4 has only one pair of poles.

It includes a first phase 50 of determining the stopped angular position of the rotor to within plus or minus 90°, followed by a second phase 52 of refining the range of uncertainty.

During the phase 50 the computer 22 executes simultaneously a step 54 of applying a sequence of voltage vectors and a step 56 of determining signals correlated to the angular position of the rotor.

During the step 54 the computer commands the application of a sequence of voltage vectors formed of only three successive voltage vectors $V_1$, $V_2$ and $V'_1$, for example. In the embodiment described here, these voltage vectors are of equal amplitude $V_0$. The chosen amplitude $V_0$ is sufficiently large to cause the appearance of a current vector whose amplitude is equal to $I_{max}$ and sufficiently small for the time interval taken to reach $I_{max}$ to be measurable with good accuracy.

$V_1$ and $V_2$ are in opposite directions and $V'_1$ is in the same direction as and superposed on $V_1$. The vectors $V_1$, $V_2$ are represented in the FIG. 4 $\alpha$, $\beta$ frame of reference together with the magnetization direction $V_R$ of the rotor. The initial angle between the vector $V_1$ and the $\alpha$ axis of the $\alpha$, $\beta$ frame of reference can be chosen at will. For purposes of illustration, the initial angle is here made equal to 0°.

Here the voltage vectors are three-phase voltage vectors, for example. Accordingly, the values of the voltages $V_A$, $V_B$ and $V_C$ forming the coordinates of each voltage vector are phase shifted relative to each other by an angle $2\pi/N$, where N is the number of phases of the stator and is equal to 3 in this example.

Figure 5:
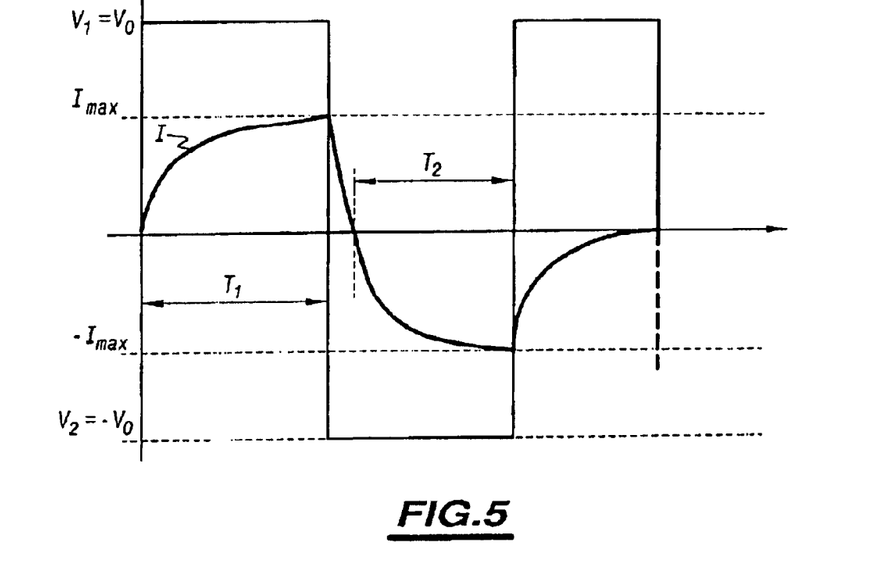
FIG. 5 shows the evolution over time of the voltage and the current on application of a sequence of voltage vectors.

The operations carried out during this step 54 are described with reference to FIG. 5. FIG. 5 shows the evolution over time of the amplitude of the voltage vector $V_T$ applied to the terminals 14 to 16 and the evolution over time of the amplitude of the corresponding current vector $V_I$.

The step 54 begins with a first operation 60 of applying the voltage vector $V_1$ to the terminals 14 to 16 for as long as the amplitude of the current vector does not reach the maximum current $I_{max}$. The amplitude I of the current vector is initially zero. In response to the application of the voltage vector $V_1$, the amplitude I of the current vector increases progressively to the current $I_{max}$ over a time period $T_1$.

At this time $T_1$, the computer 22 executes an operation 62 of applying the voltage vector $V_2$ to the terminals 14 to 16. The amplitude I of the current vector then decreases, crosses a zero value, and continues to decrease until it reaches the value $-I_{max}$. The time interval between the instant at which the amplitude I of the current vector is zero and the instant at which it is equal to $I_{max}$ is denoted $T_2$.

When the amplitude I of the current vector reaches the value $I_{max}$, the computer immediately executes an operation 64 of applying the voltage vector $V'_1$. In response to the application of this voltage vector $V'_1$, the amplitude of the current vector decreases. When the amplitude I reaches the zero value, the computer interrupts application of the voltage vector $V'_1$.

The area below the curve I is proportional to the torque of the motor. The area created by the operation 60 is not strictly equal to the area created by the operation 62. Accordingly, although the voltage vectors $V_1$ and $V_2$ are in opposite directions, there is a residual torque due to the saturation of the magnetic material of the stator during the operation 60 or the operation 62. Consequently, the application of a first voltage vector in one direction and then of a second voltage vector in the opposite direction is not sufficient to guarantee that the rotor does not move. Accordingly, to solve this problem, in the FIG. 3 method a third voltage vector $V'_1$ is applied to cancel out the residual torque. It can be shown that the area under the curve I during the operation 64 exactly cancels out the residual torque.

The computer 22 executes the step 56 simultaneously with the step 54. The step 56 consists of measuring or determining the time intervals $T_1$ and $T_2$.

Following the steps 54 and 56, the computer proceeds to a step 68 of establishing the angular position of the rotor to within ±90°. During this step 68, the computer compares the duration $T_1$ and the duration $T_2$. If the duration $T_1$ is less than the duration $T_2$, the angle $\gamma$ of the vector $V_R$ is from −90° to +90°. If not, the angle $\gamma$ of the vector $V_R$ is from +90° to −90°. If $T_1$ is equal to $T_2$, the angle $\gamma$ of the vector $V_R$ is equal to either +90° or −90°.

After this determination of one possible initial range of angular positions, the computer proceeds to the phase 52. During the phase 52, the computer commands the application of a new sequence of voltage vectors to refine the range of angular positions previously established. To this end, it begins with an operation 70 of automatically choosing the angular offset of the new sequence relative to that applied during the phase 50. During the first iteration of the step 70, the angular offset is systematically made equal to 90°. Thus the new sequence is identical to that of the phase 50 except that it is angularly offset 90° relative to the first sequence. Here the new sequence comprises a vector $V_3$ at an angle of 90° to the axis $\alpha$ of the $\alpha$, $\beta$ frame of reference, a vector $V_4$ at an angle 270° to the axis $\alpha$ of the $\alpha$, $\beta$ frame of reference, and a voltage vector $V'_3$ in the same direction as the vector $V_3$. The angular offset of the new sequence is chosen to divide into two equal portions the range of possible angular positions of the rotor or the uncertainty as to the angular position of the rotor previously established.

Figure 4:
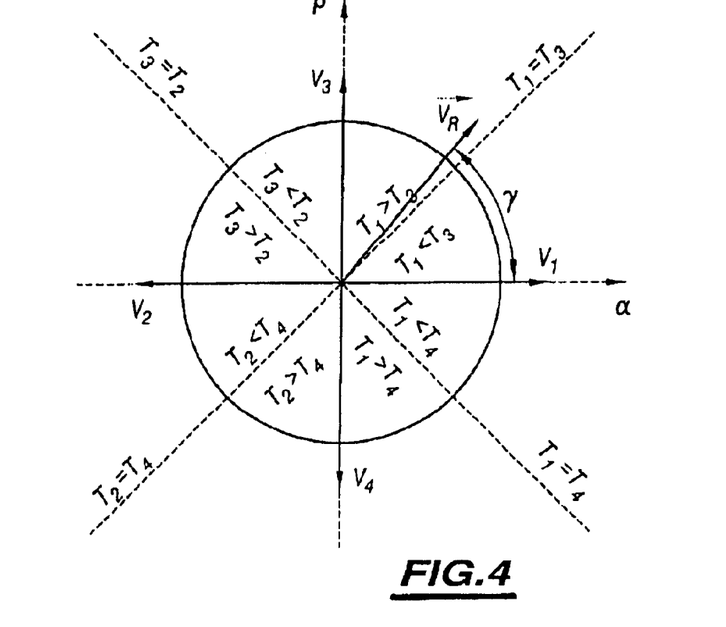
FIG. 4 shows two sequences of voltage vectors in a two-phase frame of reference fixed with respect to the stator.

FIG. 4 shows the vectors $V_3$ and $V_4$.

The computer then executes simultaneously a step 72 of applying this new sequence of voltage vectors and a step 74 of determining response signals correlated to the angular position of the rotor.

The steps 72 and 74 are respectively identical to the steps 54 and 56 except that they use the new sequence established during the step 70.

The durations determined during application of the vectors $V_3$ and $V_4$ are respectively denoted $T_3$ and $T_4$.

When the steps 72, 74 have been carried out, the computer carries out a step 76 of using the new results to refine the range previously established.

During this step, the computer carries out operations of comparing each of the durations $T_I$ determined during the steps 56 and 74 to determine which are the shortest two durations. In the example described here, since the angle $\gamma$ representing the angular position of the rotor is substantially equal to 50°, the two shortest durations are $T_1$ and $T_3$.

As shown in FIG. 4, if the duration $T_1$ is less than the duration $T_3$ the vector $V_R$ is in the angular range from 0 to 45°.

If the duration $T_1$ is greater than the duration $T_3$ the angle $\gamma$ is from 45° to 90° and if the duration $T_1$ is equal to the duration $T_3$ the angle $\gamma$ is equal to 45°. Accordingly, after this step 76, the angular position of the rotor is known to within plus or minus 22.5°.

The steps 70 to 76 are iterated for as long as the uncertainty as to the angular position of the rotor is deemed to be too great.

During the next iteration of the step 70, the angular offset of the new sequence is made equal to 45° to divide the range from 45° to 90° into two equal portions.

Accordingly, after this second execution of the steps 70 to 76, the angular position of the rotor is known to within plus or minus 11.25°.

Choosing an angular offset halving the uncertainty in accordance with the principle of dichotomy rapidly reduces the uncertainty as to the angular position of the rotor.

In the example described here, the steps 70 to 76 are iterated until the uncertainty as to the angular position of the rotor is less than plus or minus one degree.

In the particular instance in which the uncertainty as to the angular position is divided by two on each iteration and the final uncertainty must be less than plus or minus 22.5°, the step 68 and the first iteration of the step 70 are not carried out. In this particular instance, the angular offset chosen during the first iteration of the step 70 is the same regardless of the result established during the step 68. Consequently, it is possible to go directly from the steps 54 and 56 to the steps 72 and 74 by performing the first iteration of these steps 72 and 74 using a sequence of voltage vectors angularly offset 90° relative to those used during the steps 54 and 56.

The FIG. 3 method is easy to adapt to the situation in which the rotor includes a plurality of pole pairs. The position of a rotor with a plurality of pole pairs is always represented by a single voltage vector $V_R$ in the $\alpha$, $\beta$ frame of reference. Consequently, the FIG. 3 method can be applied in exactly the same way. At the end of the FIG. 3 method, only the position of one of the pole pairs of the rotor is known, which is sufficient for controlling the electric motor.

Figure 6:
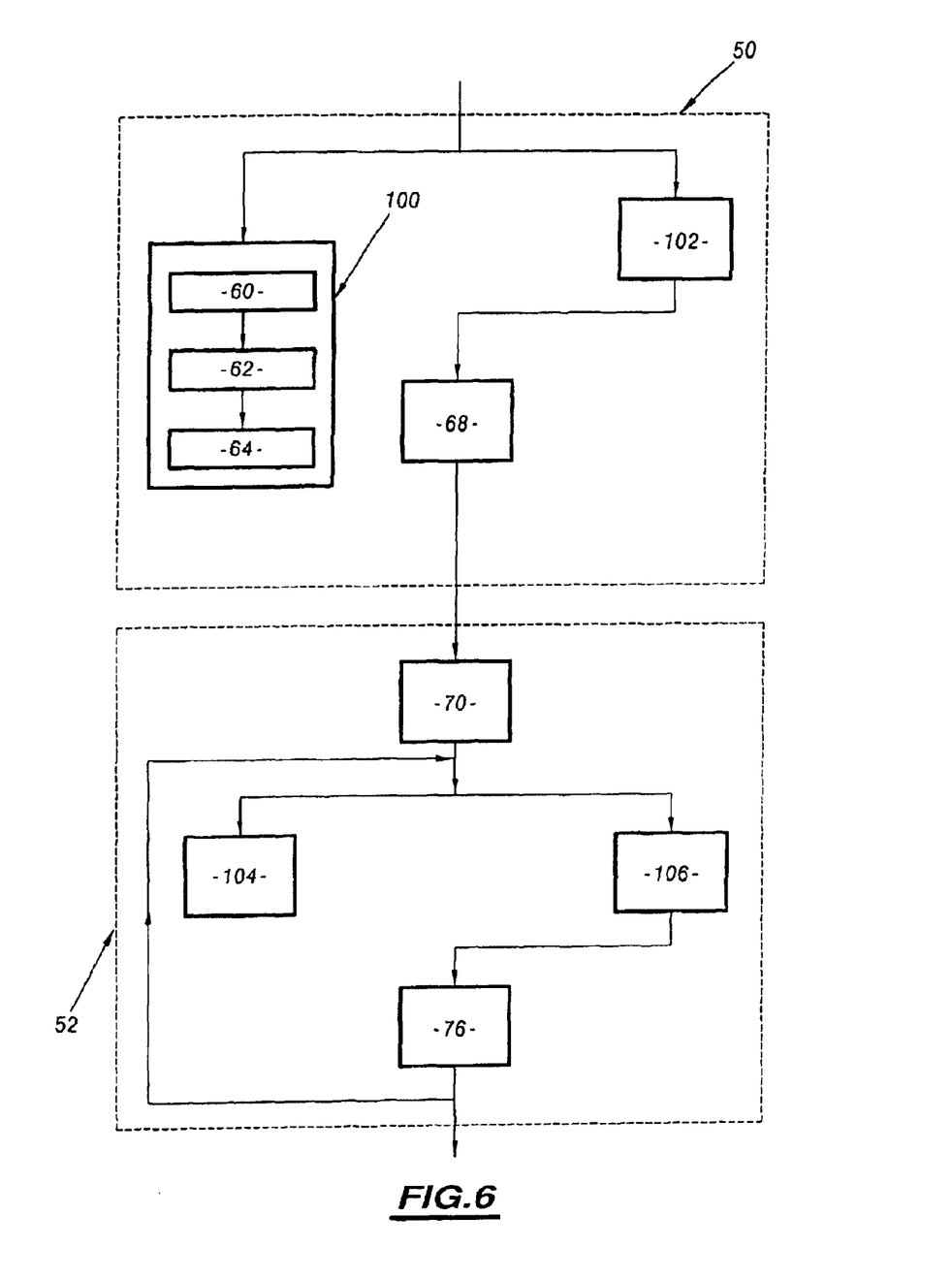
FIG. 6 is a flowchart of a second method according to the invention.

FIG. 6 shows a second embodiment of a method of determining the stopped angular position of a rotor. This method is identical to the FIG. 3 method except that the latter's steps 54, 56, 72 and 74 are replaced by steps 100, 102, 104 and 106, respectively.

In this method, it is no longer the time $T_i$ taken to reach a current threshold that is measured during each application of a voltage vector but the current reached during each application of a voltage vector for a predefined duration $D_1$.

To this end, the step 100 consists of applying a first sequence of voltage vectors formed of three vectors $V_{i1}$, $V_{i2}$ and $V_{i3}$. The orientation and amplitude of these vectors $V_{i1}$, $V_{i2}$ and $V_{i3}$ are identical to those of the vectors $V_1$, $V_2$ and $V_3$, respectively, described with reference to FIG. 5.

Figure 7:
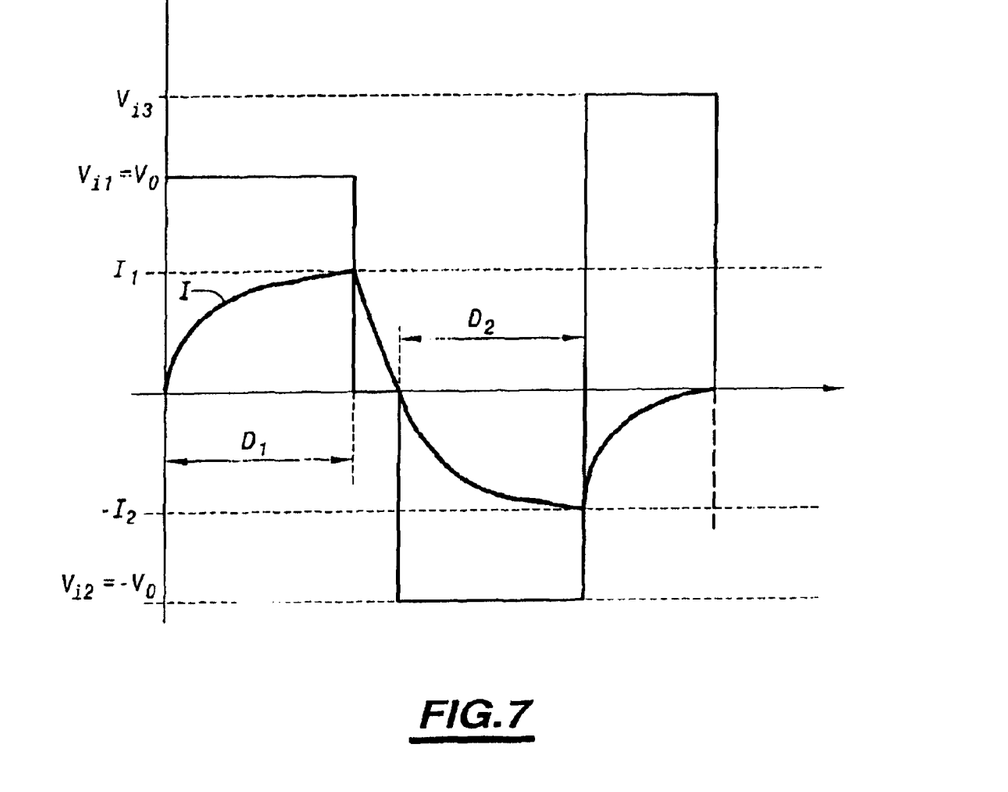
FIG. 7 shows the evolution over time of the voltage and the current on application of a sequence of voltage vectors in the case of the FIG. 6 method.

The operations carried out during this step 100 are described with reference to FIG. 7. FIG. 5 shows the simultaneous evolution over time of the amplitude of the voltage vector applied to the terminals 14 to 16 and the amplitude of the current vector $V_i$ obtained in response thereto.

During the step 100, the computer first commands the application of the vector $V_{i1}$ during only a predetermined constant duration $D_1$.

The computer then waits for the amplitude I of the current vector to cancel out. When the amplitude I cancels out for the first time, the computer then commands the application of the vector $V_{i2}$ for a duration $D_2$ equal to the duration $D_1$. Then, immediately after ceasing to apply the voltage vector $V_{i2}$, the computer applies a voltage vector $V_{i3}$ whose amplitude is computed to cancel out the residual torque of the rotor created by the application of the voltage vectors $V_{i1}$ and $V_{i2}$ and reduce the amplitude I of the current vector to zero.

The values of I after application of the vector $V_{i1}$ and after application of the vector $V_{i2}$ are denoted $I_1$ and $I_2$, respectively.

The step 102 consists of determining the values $I_1$ and $I_2$. Accordingly, in this embodiment the values $I_1$ and $I_2$ replace the values $T_1$ and $T_2$ used in the FIG. 3 method.

The steps 104 and 106 are identical to the steps 100 and 102, respectively, except that they are applied to the new sequence of voltage vectors chosen during the step 70.

In the FIG. 6 method, the duration $D_1$ is chosen so that, even when the magnetic fields of the rotor and the stator add and the soft material is saturated, the value $I_1$ or $I_2$ does not exceed the maximum current $I_{max}$.

The method of FIGS. 3 and 6 has been described in the particular instance of a three-phase synchronous rotary electrical machine. The methods described are nevertheless suitable for multiphase synchronous rotary electrical machines. The method is identical to the methods of FIGS. 3 and 6 except that the voltage vectors applied have the same number of coordinates as the stator of the machine has phases.

Finally, it is interesting to note that, in contradistinction to the prior art method as disclosed in the patent application EP 1 160 966, the methods of FIGS. 3 and 6 do not necessitate storing in a memory of the control unit data establishing the relation between the signal determined and the or each possible angular position of the rotor. Accordingly, the control unit 8 described here can be connected to any type of electric motor without it being necessary to establish this data beforehand for each type of motor.

In one variant, the current sensor 34 is eliminated. When the three-phase motor is balanced, the sum of the currents $I_A$, $I_B$ and $I_C$ is zero and the value of the current $I_C$ is easily computed from the values of the currents $I_A$ and $I_B$ measured with the aid of the current sensors 32 and 33.

What is claimed is:

1. A method of determining the stopped angular position of a rotor in a stator of a polyphase synchronous rotary electrical machine, the stator having a plurality of windings adapted to create a magnetic field driving rotation of the rotor and each winding having one or more terminals for applying a supply voltage, which method comprises the following steps:
   a) applying a first sequence of successive voltage vectors to the terminals of the windings, each voltage vector defining the value of the non-zero voltage to be applied simultaneously to the supply terminals of each winding, said first sequence including first and second voltage vectors adapted to modify the electrical characteristics of the windings when the driving magnetic field created by the windings is added to the magnetic field of the rotor and a third voltage vector adapted to cancel out the torque created by applying the first and second voltage vectors,
   b) determining a response signal from all of the windings to application of the first voltage vector and then a response signal to application of the second voltage vector, said response signals being correlated to the angular position of the rotor, and
   c) establishing the angular position of the rotor with an uncertainty of ±90° from the signals determined in the step b).

2. A method according to claim 1, further comprising the following steps:
   d) iterating the step a) n times with, on each iteration, a new sequence of voltage vectors including a voltage vector offset angularly relative to the voltage vectors of the preceding sequences, wherein n is a positive integer,
   e) on each iteration of the step d), determining, at least for the angularly offset vector, a response signal from each winding to application of said voltage vector, said response signal being correlated to the angular position of the rotor, and
   f) using the results of the step e) to reduce the uncertainty as to the position established during the step c).

3. A method according to claim 2, wherein each new sequence of voltage vectors applied further comprises first and second voltage vectors adapted to modify the electrical characteristics of the windings when the driving magnetic field created by the windings is added to the magnetic field of the rotor and a third voltage vector adapted to cancel out the torque created by application of the first and second voltage vectors.

4. A method according to claim 2, including a step of automatically choosing the angular offset of said at least one offset voltage vector of each new sequence, which offset may be arbitrary.

5. A method according to claim 4, wherein the choice of the angular offset is made automatically so as to halve the uncertainty as to the angular position.

6. A method according to claim 1, wherein the first and second voltage vectors are in opposite directions.

7. A method according to claim 1, wherein the third voltage vector is collinear with and in the same direction as the first voltage vector.

8. A method according to claim 1, wherein the first and second voltage vectors of each sequence are of equal amplitude.

9. A method according to claim 1, wherein all the voltage vectors of each of said sequences are of equal amplitude.

10. A method according to claim 1, wherein each voltage vector is obtained by means of a Concordia transformation.

11. A method according to claim 1, wherein applying each voltage vector causes a current vector to appear that is defined on the basis of the value of all the currents flowing simultaneously in each of the windings of the stator and said signal which is a function of the angular position of the rotor is the time that elapses between the instant at which the amplitude of the current vector is zero and the instant at which the amplitude of the current vector crosses a predetermined threshold.

12. A method according to claim 11, wherein the predetermined threshold corresponds to the maximum current that can flow in the windings without damaging them.

13. A method according to claim 1, wherein applying each voltage vector causes the appearance of a current vector that is defined on the basis of the value of all the currents flowing simultaneously in each of the windings of the stator and said signal which is a function of the angular position of the rotor is the value of the amplitude of the current vector after a predetermined time interval starting from the instant at which the amplitude of the current vector is zero has elapsed.

14. A method according to claim 1, wherein each voltage vector defines the voltage applied to only one voltage application terminal of each winding.

15. A method according to claim 14, wherein the response signal is determined at the terminals to which the voltage vectors are applied.

16. A computer adapted to determine the stopped angular position of a rotor in a stator of a polyphase synchronous rotary electrical machine, the stator having a plurality of windings adapted to create a magnetic field driving rotation of the rotor and each winding having one or more supply voltage application terminals,
which computer is adapted to:

a) command the application of a first sequence of successive voltage vectors to the terminals of the windings, each voltage vector defining the valve of the non-zero voltage to be applied simultaneously to the supply terminals of each winding, said first sequence including first and second voltage vectors adapted to modify the electrical characteristics of the windings when the driving magnetic field created by the windings is added to the magnetic field of the rotor and a third voltage vector adapted to cancel out the torque created by applying the first and second voltage vectors, b) determine a response signal from all of the windings to application of the first voltage vector and then a response signal to application of the second voltage vector, said response signals being correlated to the angular position of the rotor, and c) establish the angular position of the rotor with an uncertainty of ±90° from the signals determined in the step b).

17. A computer according to claim 16, further adapted to:

d) iterate the step a) n times with, on each iteration, a new sequence of voltage vectors including a voltage vector offset angularly relative to the voltage vectors of the preceding sequences, wherein n is a positive integer, e) on each iteration of the step d), determine, at least for the angularly offset vector, a response signal from each winding to application of said voltage vector, said response signal being correlated to the angular position of the rotor, and f) use the results of the step e) to reduce the uncertainty as to the position established during the step c).

18. A computer according to claim 16, capable of automatically choosing the angular offset of said at least one offset voltage vector of each new sequence, which offset may be arbitrary.

19. A computer according to claim 18, capable of automatically choosing the angular offset so as to halve the uncertainty as to the angular position.

20. A control unit for a synchronous rotary electrical machine, said control unit comprising:

a circuit for applying a voltage to the synchronous rotary electrical machine, and a computer adapted to control the voltage application circuit, wherein the computer conforms to claim 16.

21. A system for driving rotation of a rotor, said system comprising:

a synchronous rotary electrical machine adapted to drive rotation of the rotor, and a control unit for the synchronous rotary electrical machine, wherein the control unit conforms to claim 20.

* * * * *